United States Patent [19]

Bergault et al.

[11] 4,455,406

[45] Jun. 19, 1984

[54] HIGH- AND MEDIUM-DENSITY EXTRUDABLE AND CROSSLINKABLE POLYETHYLENE COMPOSITIONS

[75] Inventors: Anne-Marie Bergault, Colombes, France; Gérard Bonavent, deceased, late of Rueil Malmaison, France, by Marie-Joseph Bonavent, legal representative; Jacques Jarrin, Boulogne; Marc Mollard, both of Colombes, France

[73] Assignee: Institut Francais du Petrole, Rueil-Malmaison, France

[21] Appl. No.: 467,678

[22] Filed: Feb. 18, 1983

[30] Foreign Application Priority Data

Feb. 18, 1982 [FR] France ............................ 8202835

[51] Int. Cl.³ .................... C08L 23/26; C08L 33/08
[52] U.S. Cl. .................................... 525/194; 525/227; 525/193; 525/386

[58] Field of Search .................. 525/194, 227, 193

[56] References Cited

U.S. PATENT DOCUMENTS 2,412,475 12/1946 Semegen ................ 525/330.6
3,171,866 3/1965 Meyer et al. ............ 525/194

Primary Examiner—Carman J. Seccuro
Attorney, Agent, or Firm—Millen & White

[57] ABSTRACT

High- and medium density polyethylene compositions become extrudable and cross-linkable during the extrusion step by incorporating therein a free radical generator and an additive for plasticizing the polyethylene composition, at a relatively low extrusion temperature insufficient to decompose the free radicals generator, consisting of a $C_{14}$ to $C_{24}$ n-alkyl acrylate polymer having an average molecular weight by number of from 500 to 50,000, used in a proportion from 0.5 to 10% by weight.

12 Claims, No Drawings

HIGH- AND MEDIUM-DENSITY EXTRUDABLE AND CROSSLINKABLE POLYETHYLENE COMPOSITIONS

BACKGROUND OF THE INVENTION

This invention concerns a high- or medium- density extrudable and crosslinkable polyethylene composition. It also relates to a process for manufacturing extruded and crosslinked articles as well as the resulting aritcles.

It is known that crosslinking of high- or medium-density polyethylenes (which can be effected by a process involving reactions with radicals initiated by a free radical generator compound) improves some of their properties, particularly their mechanical properties and their resistance to heat.

It is known, on the other hand, that it is possible to shape by sintering high- or medium- density polyethylenes (crosslinkable by reaction involving radicals). However the usual sintering processes require the use of a specific apparatus and of high operating pressures. (On this subject, reference can be given, for example, to the French Pat. No. 2 383 006).

The shaping of polyethylenes by extrusion in a conventional apparatus is subject to certain difficulties.

On the one hand, as the crosslinking of high-density polyethylenes by free radical generators, effected after the shaping step (extrusion), requires the heating of the substance to be crosslinked up to the decomposition temperature of the radical generator compound, it is necessary, in order to avoid the deformation of the product, to make use of high-density polyethylenes of high molecular weight.

On the other hand, such polyethylenes cannot be extruded at a satisfactory rate, except at high temperatures which produce, as soon as the extrusion is performed, the decomposition of the usual free radical generators.

Various plasticizing agents for high-density polyethylenes are known (see for example "The technology of solvents and plasticizers" of Arthur K. DOOLITTLE—John WILEY & SONS, NEW YORK) which may be used in the presence of an initiator of radical reactions, such as a peroxide, at the temperatures required for the shaping of the material (e.g. extrusion). Plasticizing agents may be esters such, for example, as alkyl acrylates and methacrylates.

However, these plasticizing agents suffer from two major drawbacks.

On the one hand, in most cases, they react within the temperature range used for the extrusion, having the effect of initiating the cross-linking during the extrusion, which is thus disturbed.

On the other hand, they have an insufficient plasticizing effect when used at concentrations which preserve the satisfactory properties of the final crosslinked products.

Otherwise, the gel proportion of the products after crosslinking is often substantially reduced.

SUMMARY OF THE INVENTION

It has now been discovered that it is possible to produce high- or medium- density extrudable and crosslinkable polyethylene compositions under satisfactory conditions, by incorporating in the polyethylenes a reacting additive for plasticizing polyethylenes at extrusion temperatures compatible with the free radical generators (i.e. sufficiently moderate to avoid the decomposition of the free radical generator during the extrusion).

DETAILED DISCUSSION

The additives incorporated in the polyethylenes offer the additional advantage of taking part in the subsequent crosslinking by being integrated to the tridimensional network of the crosslinked polyethylene, thereby reducing the amount of extractable substance in the final material and maintaining its mechanical properties during its use, for example in hydrocarbon medium.

As a general rule, the extrudable and crosslinkable compositions of the invention comprise (a) a major proportion of an ethylene polymer or a copolymer of ethylene with a minor proportion of at least another olefin, (b) a sufficient minor proportion of at least one free radical generator compound and (c) a sufficient minor proportion of at least one "reacting additive for use", consisting of a $C_{14}$ to $C_{24}$ n-alkyl acrylate polymer or copolymer having an average molecular weight by number of from 500 to 50,000, preferably from 1,000 to 20,000.

They may further contain various usual ingredients such, for example, as anti-oxidants, dyestuffs or fillers.

The high- or medium- density ethylene polymers considered according to the invention may consist of high- or medium- density homopolyethylenes or copolymers containing, in addition, a minor proportion of units deriving from one or several other $C_3$ to $C_8$ olefin(s). These polymers have a branching rate, expressed as the number of $CH_3$ groups per 1,000 carbon atoms, lower than 2.5.

By "high-density polyethylenes" is meant, according to the invention, polyethylenes having a density of at least 0.941, the "medium-density polyethylenes" being those whose density is higher than 0.926 (according to the classification given in ASTM D 1248).

The weight average molecular weights of these polymers are relatively high. They can range, for example, from about 50,000 to 700,000; they are more particularly in the range from 100,000 to 500,000. These polymers generally have a melting index (measured at 190° C. under a load of 21.6 kg/cm$^2$) of at least 1 and which can reach, for example, 50.

As precedingly mentioned, it is possible, without departing from the scope of the invention, to use, instead of polyethylenes, ethylene copolymers formed with a minor proportion of at least one other $C_3$ to $C_8$ olefin, as for example propylene or a butene. In this case, the proportion of olefinic co-monomer is generally lower than 5% by units with respect to the final copolymer. The other properties of the so-defined ethylene copolymers are identical to those of the above considered high- and medium- density polyethylenes.

The high- and medium- density (co)polymers are generally used at the beginning of the process as powder or particles.

The free radicals generator compounds which can be used in the compositions of the invention are those whose decomposition temperature ranges from 140° to 280° C. Examples are:

dicumyl peroxide
t-butyl cumyl peroxide
2,5 dimethyl 2,5 di-(t-butylperoxy)hexane
2,5-dimethyl 2,5-di-(t-butylperoxy)3-hexyne
di-t-butyl peroxide
3,3,6,6, 9,9-hexamethyl-tetraoxocyclononane
2,2'-azo-bis-(2-acetoxy-propane)

ethyl-o-benzoyl-lauroylhydroximate
di-t-butyl peroxy terephthalate, or
3,5-bis-(tert-butyl peroxy) 3,5-dimethyl 1,2-dioxolane.

The free radicals generator compound is introduced in the compositions of the invention in a usual proportion, for example from 0.3 to 5% by weight with respect to the ethylene polymer.

The use according to the invention of additives reacting in the shaping step permits effecting the extrusion with a conventional apparatus and under conditions (flow rates, pressures and temperatures) compatible with the above-mentioned free radical generator compounds, particularly at such temperatures that a specific free radical generator which is used does not decompose during the extrusion of the mixture in the molten state. Thus, according to the selected free radical generator used, the proportion of n-alkyl polyacrylate to be used for satisfactory extruding, may be adjusted in a satisfactory manner at temperatures lower than the decomposition temperature of the considered free radical generator. The proportion of $C_{14}$ to $C_{24}$ n-alkyl polyacrylate will generally range from 0.5 to 10% by weight and preferably from 1 to 5% by weight with respect to the weight of ethylene polymer involved.

After extrusion, the shaped material is subjected to the crosslinking conditions. Particularly, it is heated to a temperature at which the free radical generator compound is decomposed, from 140° to 280° C. according to the case. The crosslinking temperature is generally 20° to 100° C. higher than the maximum temperature of the extrusion step.

In order to facilitate the crosslinking of the compositions of the invention, a co-crosslinking agent, such for example as triallyl cyanurate, may be used at the beginning in association with the free radical generator compound.

It is also possible to introduce in the compositions of the invention, before extrusion, various usual ingredients such as antioxidant additives, dyestuffs or various fillers (for example carbon black), in appropriate proportions.

The materials obtained according to the invention exhibit very satisfactory properties. In particular, after aging at 100° C. in a hydrocarbon medium the crosslinked product keeps its mechanical properties, due to the difficulty of extracting the plasticizing agent according to the invention.

Their gel proportion is only decreased to a very small extent as compared with those obtained in the absence of plasticizing agent.

The preparation of extruded and cross-linked materials according to the invention is advantageously applicable to the manufacture of tubes of diameters larger than 20 mm and more particularly from 75 to 300 mm.

The following examples illustrate the invention and must not in any manner be considered as limiting the same.

Examples 1 to 6, 10, 12, 14, 16, 18 and 20 are given by way of comparison.

EXAMPLES 1 to 9

(The examples 1 to 6 are given by way of comparison)

In these examples, compositions to be extruded and crosslinked have been prepared by using as starting thermoplastic material a high-density polyethylene of molecular weight ranging from 300,000 to 500,000.

This polyethylene, sold in the trade by Phillips Petroleum under the trade mark MARLEX 56020, has a density of 0.953 and a melting index of 2 under a load of 21.6 kg/cm².

The composition of the formed mixtures is indicated in Table I.

With the exception of sample No. 1, to which no additive was added, 1.5 part by weight of ethyl-o-benzoyl-lauroylhydroximate (radical initiator) and 1 part by weight of triallyl cyanurate per 100 parts by weight of polyethylene were added to all the other samples, 2 to 9.

To the samples of examples 3 to 6 were also added various proportions of plasticizers of the prior art and to the samples of examples 7 to 9 were added various proportions of a reacting additive of use, according to the invention. The notations are as follows:

AA : n-alkyl acrylate
AMA : n-alkyl methacrylate
APMA : n-alkyl polymethacrylate ($\overline{M}_n=4,100$)
APA : n-alkyl polyacrylate ($\overline{M}_n=2,600$)

In each case, the linear alkyl radical corresponds to an alcohol cut whose composition is approximately as follows:

| | |
|---|---|
| $C_{16}$ Monoalcohol | <1% by weight |
| $C_{18}$ Monoalcohol | <7% by weight |
| $C_{20}$ Monoalcohol | 52–64% by weight |
| $C_{22}$ Monoalcohol | 25–35% by weight |
| $C_{24}$ Monoalcohol | <6% by weight |
| $C_{26}$ Monoalcohol | <1% by weight |

The admixing of the various constituents of compositions 1 to 9 has been effected in a conventional manner with a high-speed mixer at a rate of 3,000 r.p.m. for 10 minutes.

An attempt to extrude these compositions has been conducted with a GOTTFERT machine provided with a screw of a diameter D=20 mm and a length of 20 D.

Two operating manners were used:
(a) -with temperatures in the three zones of the sleeve of respectively: 130°–135°–140° C. (extrusion at 140° C.)
(b) - with temperatures in the three zones of the sleeve of respectively: 150°–155°–160° C. (extrusion at 160° C.).

The rotation speed of the extruder screw was the same in the two cases: 40 r.p.m.

The extrusion rates indicated in Table I have been calculated by the formula:

$$\text{rate (g/h.atm.)} = \frac{\text{weight of the extruded material}}{\text{time} \times \text{pressure at the head of the drawing plate}}$$

The gel proportions after extrusion have been determined by extraction with boiling xylene for 8 hours.

After extrusion, the mixtures have been granulated, then cross-linked in a press at 250° C., for 30 minutes under 150 bars. The gel proportions of the obtained plates have been determined as precedingly. In the cases where extrusion was impossible, the crosslinking has been effected on the initial mixture.

As shown in Table I, it appears from comparative examples 3 and 4 that acrylates or methacrylate monomers have a high reactivity during the extrusion (the gel proportions after extrusion range from 15 to 60%).

TABLE 1

| EXAMPLE No. | ADDITIVE | CONTENT (% by weight) | EXTRUSION RATE 140° C. g/h.atm. | EXTRUSION RATE 160° C. g/h.atm. | GEL PROPORTION AFTER EXTRUSION (%) | APPEARANCE AFTER EXTRUSION | GEL PROPORTION AFTER CROSS-LINKING UNDER PRESSURE (%) |
|---|---|---|---|---|---|---|---|
| 1* | — | — | — | 14 | 0–1 | good | — |
| 2 | — | — | very low rate | | 10 to 50 | bad | 96 |
| 3 | AA | 1 | very low rate | | 60 | bad | 98 |
| 4 | AMA | 1 | very low rate | | 16 | bad | 98 |
| 5 | APMA | 2 | 25 | 50 | 5 to 10 | bad | 93 |
| 6 | APMA | 10 | 70 | 120 | 0–1 | good | 89 |
| 7 | APA | 1 | 30 | 60 | 0–1 | good | 95 |
| 8 | APA | 2 | 40 | 90 | 0–1 | good | 95 |
| 9 | APA | 10 | 90 | 150 | 0–1 | good | 93 |

*MARLEX 56020 in the absence of free radicals initiator.

Comparative examples 5 and 6, as compared with examples 8 and 9, show that the use of an alkyl polymethacrylate results in a lower plasticizing effect than that obtained with the same concentrations of alkyl polyacrylates, as well as in a substantial decrease of the gel proportion after cross-linking.

EXAMPLES 10 to 19

(Examples 10, 12, 14, 16 and 18 are given by way of comparison)

In these examples, several polymers of different densities (starting from 0.938) and different (from 2 to 20) melting indices (under 21.6 kg/cm² at 190° C.) were used.

The reacting additive for use, according to the invention, was a n-alkyl polyacrylate having an average molecular weight by number of 9700, whose linear alkyl portion corresponds to an alcohol cut having approximately the following composition:

| | |
|---|---|
| $C_{14}$ Monoalcohol | <2% by weight |
| $C_{16}$ Monoalcohol | 47–55% by weight |
| $C_{18}$ Monoalcohol | 26–34% by weight |
| $C_{20}$ Monoalcohol | 10–18% by weight |
| $C_{22}$ Monoalcohol | <3% by weight |

Several different free radical generators have been used.

In two comparable formulations (examples 12 and 13) a carbon black filler has been incorporated, whose characteristics were as follows:

specific surface BET ($N_2$): 1000 m²/g
volume of void (DBP): 340 ml/100 g
particles size: 30 mμ

As in examples 1 to 9, the extrusion has been conducted at two different temperatures (140° and 160° C.) for each formulation.

The cross-linking of the samples of examples 10 to 15 has been effected in a press at 250° C. for 20 minutes, whereas the cross-linking of the samples of examples 16 to 19 was conducted at 200° C.

The composition of the various formulations is reported in Table 2, as well as the observations and results relating to each experiment.

In all cases, it appears that the introduction of the above-described polyacrylate provides for an increase of the extrusion rate without producing a too substantial decrease of the gel proportion after the subsequent cross-linking step.

TABLE 2

| EXAMPLE No. | POLYETHYLENE DENSITY | POLYETHYLENE $MI_{21.6}$ Melting index | RADICALS GENERATOR NAME | RADICALS GENERATOR Content (% by weight) | BLACK content (% by weight) | PAA content (% by weight) | EXTRUSION RATE 140° C. g/h. atm. | EXTRUSION RATE 160° C. g/h. atm. | GEL PROPORTION after cross-linking in a press (%) |
|---|---|---|---|---|---|---|---|---|---|
| 10 | 0.961 | 20 | ethyl-o-benzoyl lauroyl-hydroximate | 1.5 | 0 | 0 | 90 | 110 | 80 |
| 11 | 0.961 | 20 | ethyl-o-benzoyl lauroyl-hydroximate | 1.5 | 0 | 2 | 150 | 190 | 80 |
| 12 | 0.961 | 20 | ethyl-o-benzoyl lauroyl-hydroximate | 1.5 | 2 | 0 | irregular and low rate | | 79 |
| 13 | 0.961 | 20 | ethyl-o-benzoyl lauroyl-hydroximate | 1.5 | 2 | 2 | 70 | 100 | 78 |
| 14 | 0.953 | 2 | 2,2'-azo-bis-(2-acetoxy-propane) | 0.5 | 0 | 0 | cannot be extruded | | — |
| 15 | 0.953 | 2 | 2,2'-azo-bis-(2-acetoxy-propane) | 0.5 | 0 | 2 | 30 | 90 | 85 |
| 16 | 0.945 | 9 | 2,5-dimethyl 2,5-di-(t-butyl peroxy) hexane | 0.5 | 0 | 0 | cannot be extruded | | — |
| 17 | 0.945 | 9 | 2,5-dimethyl 2,5-di-(t-butyl peroxy) hexane | 0.5 | 0 | 1 | 15 | 40 | 87 |
| 18 | 0.938 | 20 | 2,5-dimethyl 2,5-di-(t-butyl peroxy) hexane | 0.5 | 0 | 0 | cannot be extruded | | — |
| 19 | 0.938 | 20 | 2,5-dimethyl 2,5-di-(t-butyl peroxy) hexane | 0.5 | 0 | 0.5 | 30 | 65 | 86 |

TABLE 2-continued

| EXAMPLE No. | POLYETHYLENE DENsity | MI$_{21.6}$ Melting index | RADICALS GENERATOR NAME | Content (% by weight) | BLACK content (% by weight) | PAA content (% by weight) | EXTRUSION RATE 140° C.    160° C. g/h. atm. | GEL PROPORTION after cross-linking in a press (%) |
|---|---|---|---|---|---|---|---|---|
| | | | ne | | | | | |

EXAMPLES 20 to 26

(Example 20 is given by way of comparison)

These examples illustrate the use of n-alkyl polyacrylates of mean molecular weight by number varying between 2,000 and 20,000, at different concentrations. For each polyacrylate, the alkyl portion corresponds to the same linear monoalcohol cut as that considered in the additives of examples 3 to 9.

The same high-density polyethylene as in examples 1 to 9 (MARLEX 56 020 of Phillips Petroleum) has also been used and the free radicals generator was ethyl-o-lauroylhydroximate, used in a proportion of 1.5 parts by weight per 100 parts by weight of polyethylene.

The extrusion has been conducted at a maximum temperature of 160° C. and the cross-linking was effected in a press at 250° C. for 30 minutes.

The results indicated in Table 3 show that the additive becomes more particularly efficient for contents of at least 1% by weight. For contents close to 5% by weight, in the cross-linking conditions, the gel proportion is not reduced.

TABLE 3

| EXAMPLE No. | Content PAA (% by weight) | $\overline{M}_n$ | EXTRUSION RATE at 160° C. (g/h.atm) | APPEARANCE AFTER EXTRUSION | GEL PROPORTION AFTER CROSS-LINKING IN A PRESS |
|---|---|---|---|---|---|
| 20 | 0 | — | cannot be extruded | bad | |
| 21 | 0.5 | 2,600 | 20 | middle | 85 |
| 22 | 1 | 2,600 | 80 | good | 83 |
| 23 | 2 | 2,600 | 110 | good | 81 |
| 24 | 5 | 2,600 | 180 | good | 80 |
| 25 | 2 | 9,700 | 105 | good | 82 |
| 26 | 2 | 18,000 | 95 | good | 81 |

What is claimed is:

1. An extrudable and crosslinkable composition, which comprises:
   (a) a major proportion of a polyolefin which is a high- or medium-density polyethylene or a copolymer of ethylene units and less than 5% of $C_3$ to $C_8$ olefin units,
   (b) a minor proportion of at least one free radical generator compound, and
   (c) a proportion from 0.5 to 10% by weight of at least one $C_{14}$ to $C_{24}$ n-alkyl acrylate polymer, having an average molecular weight by number of from 500 to 50,000.

2. A composition according to claim 1, wherein said polyolefin is a high- or medium-density polyethylene having an average molecular weight from 50,000 to 700,000.

3. A composition according to claim 1, wherein said polyolefin has a branching rate lower than 2.5 $CH_3$ groups per 1,000 carbon atoms.

4. A composition according to claim 1, wherein the free radical generator compound has a decomposition temperature ranging from 140° to 280° C.

5. A composition according to claim 1, wherein the proportion of the free radical generator compound is from 0.3 to 5% by weight with respect to the polyolefin weight.

6. A composition according to claim 1, wherein said n-alkyl polyacrylate has an average molecular weight by number of from 1,000 to 20,000.

7. A composition according to claim 1, wherein the proportion of said n-alkyl polyacrylate is from 1 to 5% by weight with respect to the polyolefin weight.

8. A composition according to claim 1, which further comprises a minor proportion of co-crosslinking agent.

9. A composition according to claim 1, wherein further comprises at least one ingredient selected from anti-oxidant additives, dyestuffs and fillers.

10. A process for manufacturing an extruded and cross-linked material, which comprises a first step of extruding a composition according to claim 1, at temperatures lower than the decomposition temperature of said free radical generator compound, and a second step of subjecting the extruded product to a temperature at least equal to the decomposition temperature of the free radical generator compound.

11. An extruded and cross-linked product obtained by the process according to claim 10.

12. An extruded and cross-linked product according to claim 11, consisting of a tube of large diameter.

* * * * *